United States Patent Office 2,933,235
Patented Apr. 19, 1960

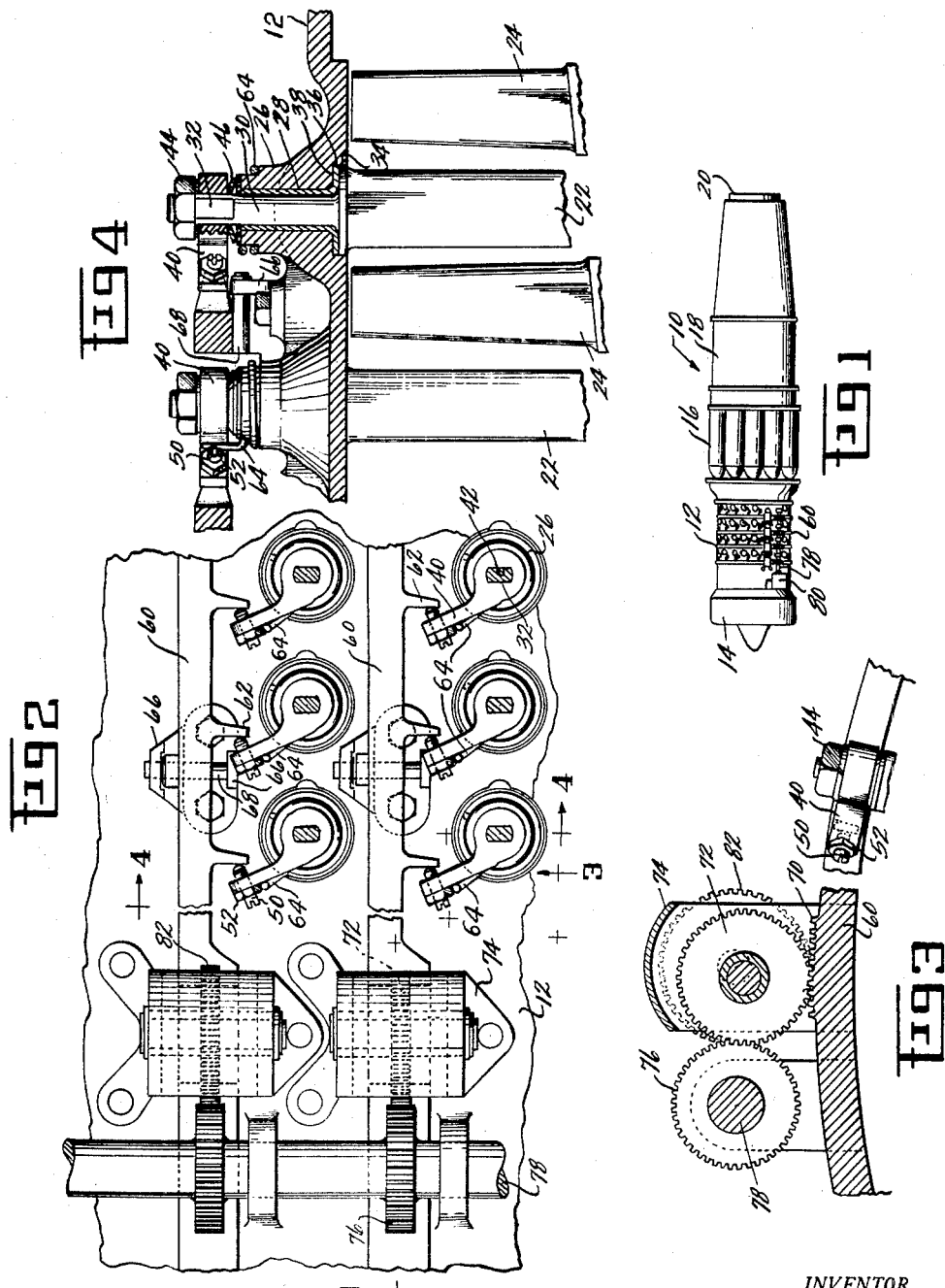

2,933,235

VARIABLE STATOR COMPRESSOR

Gerhard Neumann, Cincinnati, Ohio, assignor to General Electric Company, a corporation of New York Application January 11, 1955, Serial No. 481,226

3 Claims. (Cl. 230—114)

This invention relates to a turbomachine and in particular to an axial-flow compressor for a gas turbine.

In order to obtain more efficient performance from an engine, it is very desirable to have a high pressure ratio compressor for the engine. However, whenever a high pressure ratio compressor is used, stall characteristics occur during various stages of increasing speeds. In order to prevent these stall characteristics from occurring, it is desirable to incorporate stator vanes which are adapted to be varied so as to provide the correct angle of attack of the air foil for the particular velocity of flowing air. Attempts have been made to provide a multiple positioning and scheduling device for actuating the angles of attack of one or more stages, or rows, of stationary vanes in an axial-flow compressor, simultaneously according to a pre-determined relationship.

In order to provide rotational movement to the stator vanes of an axial-flow compressor, an actuator band surrounding the compressor has been used in which it is pivotally connected to a lever connecting the actuator band to the stator vane. Since the actuator band rotates in a different plane from the lever arm, a pivotal connection between the two becomes impossible or a substitute therefore becomes very cumbersome. It is therefore an object of this invention to provide a means for actuating the stator vane by an actuator band through a lever without securing the lever and actuator band together.

It is a further object of this invention to provide a mechanism for varying the positions of the stator vanes of an aircraft gas turbine engine in which each stator vane has a lever fixed to the base thereof, which lever is adapted to be actuated by an actuator band which is in contact with but not pivotally connected to the lever arm, and in which the actuator bands are moved circumferentially about the compressor casing since the actuator bands have a rack thereon and are driven by an idler gear and drive gear which is mounted on a torque tube.

Briefly stated, and in accordance with one aspect of this invention, I provide a variable stator compressor in which the actuator bands for each row of adjustable stator vanes engage lever arms on the stator vanes but are not connected to them, adjusting means are provided on the lever arms to initially position the stator vane at the correct angle of attack, spring means are provided for urging the adjustable means on the lever arms to engage the actuator band, and spring means are provided to urge each of the vanes in a radial outwardly direction so as to have the base of the vanes seat on the compressor casing and thereby prevent leakage from within the compressor. I further provide a torque tube which has drive gears mounted thereon, one for each stage, which mesh with different size idler gears which in turn engage with each actuator band so that upon rotation of the torque tube the idler gears will adjust the actuator band by the amounts desired for appropriate adjustment of the vanes in the compressor.

These and other objects will become more apparent when read in the light of the accompanying drawing and specification, and wherein like parts will be designated by the same number; and wherein Figure 1 is a view of an aircraft gas turbine engine, Figure 2 is an elevational view showing the torque tube and gear mechanism for driving the actuator band and the levers connected to the stator vanes.

Figure 3 is a cross-sectional view taken on lines 3—3 of Figure 2,

Figure 4 is a cross-sectional view taken on lines 4—4 of Figure 2.

Referring to the drawing, the numeral 10 generally designates an aircraft gas turbine engine provided with a compressor 12, having an inlet 14 in which motive fluid can be taken in by the engine and compressed by the compressor. The compressed air then passes downstream into the combustion chambers 16 for the combustion thereof so as to increase the velocity of the motive fluid and passes through the turbine 18 from which energy is taken out of the motive fluid before it is discharged to the atmosphere through the nozzle 20.

The compressor 12 is provided with a plurality of stator vanes 22, positioned between a plurality of rotors 24. The stator vanes are rotatably mounted in the casing 12 at a plurality of built up portions 26. An opening 28 extends through the built up portions 26 (Fig. 4) for receiving the base extension 30 of the stator vane 22. The base extension 30 terminates into a rectangular configuration 32 the purpose of which will be hereinafter more fully explained. It is noted also that the stator vane 22 is provided with a flat base portion 34 which is adapted to be seated against a bushing 36 which is seated on a flat bearing surface 38.

In order to rotate the stator vane 22, a lever arm 40 is fitted to the rectangular portion 32 which passes through a rectangular broach opening 42 in the lever arm 40 so as to provide positive turning movement between the lever arm 40 and the base extenson of the stator vane 22. In this manner the stator vane 22 will rotate with the lever arm 40. The end of the rectangular portion 32 is threaded so as to receive a nut or the like 44 for securing the lever arm 40 on the rectangular portion 32. In order to maintain the lever arm 40 in engagement with the nut 44 at all times, a Bellville type spring washer 46 is positioned between the lever arm 40 and the built up portion 26. The washer 46, bearing against the lever arm 40, urges the nut 44 radially outwardly along with the base extension 30 so as to bias the flat base portion 34 against the bushing 36 even though some wear may take place on the nut or lever arm. This arrangement will prevent leakage from the compressor. At the extremity of the lever arm 40 there is a set screw 50 threadably mounted therein so as to permit adjustment of the position of the variable stator vane 22. A lock nut 52 is provided to secure the set screw in place after the stator vanes have been adjusted to their desired position.

For each stage of stator vanes an actuator band 60 is provided for actuating the lever arm 40 and in turn the stator vane 22. Integrally attached to the actuator band 60 are a plurality of longitudinally extending actuating arms 62. It is noted that there is one actuating arm for each rotatable stator vane 22. The actuating arm 62 engages the set screws 50 for the actuation thereof in order to rotate the stator vanes 22. It is noted also that the set screws 50 when operated can move along the actuating arms 62 in an axial direction without affecting the operation of the device by binding or the like even though they rotate in different planes. It is also noted that spring 64 located between the built up portion 26 and the lever arm 40 is fixed thereto in order to exert pressure on arm 40 so as to maintain the set screw 50 in engagement with the actuating arm 62. Fixed to the casing 12 are a plurality of brackets 66 which have rotatably mounted pins 68 therein upon which the actuator bands 60 are mounted so that they may be rotated with a minimum amount of friction. As shown in Figures 2 and 3, each actuator band is provided with a rack 70. The rack 70 is in meshed engagement with an idler gear 72 rotatably mounted in a housing 74 which is fixed to the casing 12 by bolts or the like. The idler gear 72 is driven by a pinion gear or the like 76 fixed to a torque tube 78 so as to rotate therewith. The torque tube 78 is fixed to an actuating means such as a motor or the like 80 (Fig. 1) for rotation of the torque tube. In order to rotate the actuator band 60 by different amounts a different size idler gear is provided for each stage as shown at 72 and 82.

In order to accelerate a high pressure ratio compressor from zero speeds to maximum speed, stall conditions take place at various intermediate speeds. The area in which these stall conditions exist can be found for each engine. In order to eliminate the stall conditions at the various stages, each stage of stator vanes are rotated a pre-determined amount to present the correct angle of attack for air flow at that particular speed. Therefore, the mechanism can be so dimensioned as to give the correct amount of turn to each stage or stator vane so as to prevent stall at any of the particular speeds. The actuator mechanism 80 can be provided with a control mechanism (not shown) responsive to the various speeds and other parameters so as to automatically position the stator vanes for the particular conditions and speeds desired. Therefore, whenever the motor 80 rotates the torque tube 78, the pinion 76 will drive the idler gears 72, 82, etc., which in turn actuates the actuator band 60 according to the pre-determined schedule so as to actuate the levers 40 through the set screws 50. Since the levers 40 are fixedly secured to the stator vanes 22 they will turn a pre-determined amount with the other stator blades of the various stages simultaneously and at different amounts. Since the idler gears 72 and 82 are of different size, the actuator bands will be rotated different amounts. Therefore, each stage of stator vanes will be rotated by different amounts.

Therefore, applicant has provided a very simple device for rotating the stator vanes by geared actuating bands, permitting the point of contact between the lever arms 40 and the actuator bands 60 to move in different planes without affecting the smooth operation of the device.

The specific embodiment described above has been given by way of illustration and not by way of limitation. Many modifications and improvements can be made to the above design without departing from the spirit and scope of the invention, all of such modifications and improvements are to be regarded as equivalents and be included within the spirit and scope of this invention.

What I claim as new and desire to secure by Letters Patent of the United States is:

1. An axial flow compressor including at least one stage of stator vanes rotatably mounted in said compressor, lever arms fixed to said stator vanes to rotate therewith, an actuator band for each stage of rotatable stator vanes having actuating arms thereon for engaging said lever arms, resilient means for biasing said lever arms into engagement with said actuator arms, adjustable means on each lever arm for positioning the lever arms with respect to the actuating arms, and means operatively connected to each band for actuating said actuator bands so as to rotate each stage of stator vanes.

2. An axial flow compressor comprising a plurality of stages of stator vanes rotatably mounted in the casing of said compressor, lever arms fixed to the base of said stator vanes for rotation thereof, adjustable means at the extremities of said lever arms, an actuator band for each stage of stator vanes, said actuator bands each having a plurality of actuator arms thereon, said actuator arms being in engagement with said adjustable means for actuation thereof, spring means positioned between said lever arms and compressor casing for providing a torque to said lever arms to maintain engagement between said adjustable means and actuator arms at all times.

3. In an axial flow compressor having a plurality of stages of adjustable stator vanes therein, an actuator band for each stage, the base portion of each stator vane being provided with a lever arm juxtapositioned to said actuator band, a spring biasing the lever arm to engage the actuator band, a torque tube mounted on the compressor provided with a drive gear for each actuator band, idler gears mounted on the compressor in engagement with the drive gear of an actuator band, and the idler gears being of a predetermined size to give a predetermined simultaneous movement to each of the actuator bands, means for rotating the torque tube whereby the stages of rotatable stator vanes are adjusted a predetermined amount.

References Cited in the file of this patent

UNITED STATES PATENTS

| | | |
|---|---|---|
| 1,988,163 | Church | Jan. 15, 1935 |
| 2,371,706 | Planiol | Mar. 20, 1945 |
| 2,495,433 | Troller | Jan. 24, 1950 |
| 2,500,070 | Hagen | Mar. 7, 1950 |
| 2,606,713 | Bauger | Aug. 12, 1952 |
| 2,651,496 | Buckland | Sept. 8, 1953 |

FOREIGN PATENTS

| | | |
|---|---|---|
| 13,298 | Austria | Sept. 10, 1903 |
| 21,272 | Norway | Feb. 27, 1911 |
| 245,483 | Switzerland | July 16, 1947 |
| 760,799 | Germany | Jan. 19, 1953 |
| 908,121 | France | Aug. 13, 1945 |